United States Patent [19]

Schneider

[11] 4,225,359
[45] Sep. 30, 1980

[54] ACIDIC EARTHEN CEMENTED COMPOSITIONS FOR BUILDING MATERIALS AND PROCESS

[76] Inventor: Gordon L. Schneider, 4214 Cottage Cir. No. 3, Las Vegas, Nev. 89109

[21] Appl. No.: 34,189

[22] Filed: Apr. 27, 1979

[51] Int. Cl.² .............................................. C04B 7/352
[52] U.S. Cl. ...................................... 106/93; 106/99; 106/118; 106/241; 106/242; 106/281 R; 106/900
[58] Field of Search ....................... 106/90, 92, 93, 99, 106/118, 281, 241, 242, 900

[56] References Cited

U.S. PATENT DOCUMENTS

| | | | |
|---|---|---|---|
| 3,635,742 | 1/1972 | Fujimasu | 106/900 |
| 3,876,439 | 4/1975 | Schneider | 106/900 |
| 3,950,179 | 4/1976 | Schneider | 106/900 |
| 3,980,489 | 9/1976 | Schneider | 106/900 |
| 3,980,490 | 9/1976 | Schneider | 106/900 |

*Primary Examiner*—James Poer
*Attorney, Agent, or Firm*—Seiler & Quirk

[57] ABSTRACT

An improved earthen composition suitable for building construction comprises soil, a sulfonic acid, cellulose and a cementing agent comprising a calcium cement such as Portland cement, lime or calcium carbonate and/or an asphalt cement such as asphaltic concrete, asphalt, or tar. The compositions are prepared in an aqueous mixture, which is then tamped or consolidated, and dried.

13 Claims, No Drawings

ACIDIC EARTHEN CEMENTED COMPOSITIONS FOR BUILDING MATERIALS AND PROCESS

BACKGROUND OF THE INVENTION

The present invention relates generally to compounds and methods for utilizing soils found in place as materials of construction in the fabrication and erection of homes, offices, apartments, condominiums and commercial structures as an economical substitute for lumber, bricks, concrete blocks, poured concrete, lath and plaster, dry wall gypsum board, fiberboard, chip board, masonite and to some degree at least, various insulating materials such as fiberglass, rock wool, cellulose and various foamed materials. That many of these materials are now in very short supply and that their prices are continually escalating has been pointed out in my co-pending patent application entitled: Improved Earthen Cement Compositions for Building Materials and Process, Ser. No. 928,798, filed July 28, 1978. In that application the severe limitations placed upon the use of soils as construction materials was described. While the compounds and methods encompassed therein did constitute a major and important step in promoting a new state of the art of utilizing soils in the construction of homes and buildings, the need for an earthen composition that would be inherently waterproof and that would make use of less expensive cementing agents led to the development of the methods and compounds described subsequently in this application.

For thousands of years man has built structures of soil, and even today such buildings are constructed in many countries, especially in the less industrialized areas. Usually soils are only successfully used as construction materials where the climate is hot and dry and where the soil is of the class commonly known as adobe. In the United States the area in which adobe or rammed earth structures are permitted by building codes is limited to the southwestern part of the country, extending from Texas to Southern California and northward as far as central Colorado. While straw, manure and pine needles were often blended into sun-dried adobe blocks in the past, uniform and local building codes today prohibit the inclusion of more than 0.5% organic matter and not more than 0.3% soluable salts in the composition of such blocks. In addition, the clay used in unburned brick masonry must be blended with more coarsely graded soils such as sand before being utilized for such purposes.

A typical ASTM composition specification will contain from 55%–75% sand and 25%–45% silt and clay. Not more than 10% may be retained on a No. 1 sieve; not less than 25% nor more than 50% can pass a No. 200 mesh sieve; and the soil must have a plasticity index not less than 2 nor more than 15. Stabilizers such as Portland cement, lime and asphalt, either quick drying cutback or emulsion are used. The bricks must be sealed with a water repellant chemical so as not to absorb more than 2½% by weight of water when placed upon a constantly water saturated surface for seven days. Typical strength requirements are as follows: Compressive strength average of 300 psi on 5 masonry units with minimum of 250 psi on any one; absorption maximum of 2½% seven days exposure of one face; modulus of rupture minimum of 50 psi on average of 5 masonry units with tolerance of 30 psi for one unit; erosion maximum of 1/16-inch deep when subjected to 20 psi pressure water spray.

The use of unburned masonry bricks in cool rainy climates is usually prohibited by local building codes even if they are produced in accordance with ASTM or UBC standards. While it is one of the purposes of this invention to make possible the production and use of unfired masonry bricks in any part of the United States including areas of high rainfall and frequent freeze and thaw cycles, another purpose is the improvement of the state of the art of tamping earthen compositions into forms so as to be able to economically construct solid exterior and interior walls.

The chemicals employed under my co-pending patent application Ser. No. 928,798 operate in the hydroxide phase, preferably at a pH in excess of 12.5. On the other hand, the cemented compositions described herein are achieved in the acid phase by momentarily reducing the pH to a point below 2.0 and preferably at or near 1.0 to 1.2. It represents an extension of the state of the art of sulfonic acid stabilization and utilization as taught by my U.S. Pat. No. 3,876,439 entitled Soil Stabilizing Agent Comprising an Acid Sludge-Sulfuric Acid Product and Method for Preparing the Agent and my co-pending patent application Ser. No. 923,799 entitled Acidic Asphaltic Composition and Method.

My aforesaid U.S. Pat. No. 3,876,439 teaches that a soil stabilizing agent consisting of a source of calcium, such as calcium carbonate, and a spent sulfuric acid, along with certain ancillary components, can stabilize finely divided soils, reduce erosion and eliminate problems usually associated with frost heaving or lensing. Its effectiveness is primarily due to the reduction in moisture content that any clay or silt will demonstrate after treatment. However, the strength of the cemented bonds within the soil structure are not such as to achieve the compressive strength required for use in building structures above ground even if used at the maximum rate recommended. Also, the ability of water to freely enter and leave the structure does not recommend it for such purposes.

My co-pending patent application Ser. No. 923,799 demonstrates that dilute aqueous solutions of a sulfonic acid when used in conjunction with paving aggregates and asphalt will make possible the reduction of the use of asphaltic concrete by from 10%–40% while achieving comparable strength and durability when compared with standard paving compositions. It further teaches that paving asphalts may be applied to rock, gravel, sand and soils present in the roadbed in conjunction with heat, hot water or steam and a sulfonic acid source so as to achieve compositions satisfactory for use as either paving materials or asphalt stabilized base. However, while a waterproof composition is readily achieved by utilizing the process described therein when the type of aggregate suitable for paving materials is present, a composition satisfactory as a material of construction in buildings cannot be produced from in place soils even at the maximum rates of sulfonic acid and asphalt usage described therein.

While sulfonic acids used in conjunction with sources of calcium in accordance with my U.S. Pat. No. 3,876,439 or with paving asphalt as specified in my copending patent application Ser. No. 923,799 do not provide a composition suitable for use as a building material when combined with clays, silts, loams or sands usually found at a building site, suitable compoditions can be achieved by incorporating one or more of the constituents mentioned in my co-pending patent application Ser. No. 928,798 and concurrently adjusting the rate of usage of sulfonic acids, sources of calcium and asphalt as detailed subsequently in this application. Other cementing agents that will provide higher bonding strength may be used as hereinafter described. In addition, a desirable alteration in the basic energy capacity and energy resistance of typical soils may be achieved in a manner similar to that described in my co-pending patent application Ser. No. 928,798.

SUMMARY OF THE INVENTION

It is an object of the present invention to provide a low cost building material composition comprising soil, a sulfonic acid, cementing agents consisting of cement, lime, calcium carbonate, asphalt, tar, various resins or glues, cellulosic and fibrous materials which composition may be further modified by the inclusion of clay, sand, gravel, crushed rock, flyash, sewage sludge and plant or mineral fillers, depending upon the characteristics of the soil material being used. The cementing agents may be used individually or collectively depending upon the strength desired. The addition of sources of finely divided cellulosic materials such as newspaper pulp contributes both to increased strength and improved flexural characteristics of the composition. Compositions displaying energy capacity characteristics similar to that of concrete or stone may be economically produced which can provide the interior thermal mass necessary for the economic utilization of heat within a structure, whether provided by fossil fuel or solar energy. Compositions displaying reduced energy capacity and increased energy resistance (higher R values) may be produced by incorporating substantial quantities of wood or plant fiber or cellular materials such as vermiculite, cinders, etc. These compositions also produce a waterproof and fireproof material that may be tamped into molds or forms and used in the construction of load bearing or non-load bearing walls and may be integrated with standard structural materials as may be necessary to meet local engineering specifications and building codes. The composition may be fabricated into blocks or bricks or formed into sheets in the same manner as gypsum board, masonite, particle board or chip board into which nails, screws, bolts, anchors and other types of fasteners normally used with wood products may be driven, fastened or otherwise secured and may be painted, sealed or otherwise finished in the same manner. These compositions also produce materials that may be readily troweled, poured, sprayed or jetted into place. The compositions of the invention may be used not only in building construction to form exterior or interior walls, floors, footings, foundations, ceilings and roofs, but may also be used for constructing fences, patios, driveways, roads and streets. Further, the enhanced qualities of the compositions result in improved stress acceptance, higher bearing values and improved sound absorbing properties. These as well as other improvements achieved by the compositions of the invention will be evident to those skilled in the art from the following detailed description.

DETAILED DESCRIPTION OF THE INVENTION

According to the invention, the present composition comprises the modification of various soils utilizing a sulfonic acid, cellulose, one or more cementing agents selected from the following groups: sources of calcium such as Portland cement, lime or calcium carbonate; asphalt, either cutback, slow, medium or rapid curing, emulsion, cationic, anionic, or nonionic or asphaltic concrete, AC5, 10, 20, etc.; tars, either petroleum or coal; synthetic or natural resins, phenolic, urea-formaldehyde, polyvinyl chloride, polystyrene, polyurethane, shellac, etc.; and various animal glues and vegetable gums and starches; and other optional materials as will be described.

The soil used may be from any earth source, preferably readily available from local or easily accessible sources. Accordingly, such soils include clay, i.e. soils having a relatively high clay content, silts, normally characterized by particle sizes between that of clay and sand, caliche, loam, blow sand, gravel, and the like. Usually, such enumerated soil materials are those which are found alone or combined throughout the world. The specific soil is not so important, so long as it is compounded as will be taught hereinafter, whereby lack of certain original soil characteristics may be compensated for by the inclusion of optional ingredients such as clay and/or mineral fillers, depending on the final desired properties. According to the invention, it is the intention herein not to exclude any specific soils. The soil selection may be important as it relates to the particle sizes of the soil which will affect the amount of sulfonic acid required. For example, a finely divided colloidal clay will have a total surface area of 1,000 times that of the same volume of coarse silt, and thus the sulfonic acid salts obtained and concomitant neutralization of sulfonic acid will be significantly increased where the particle sizes of soil are smaller. Sand particles sizes (average diameter) range from coarse (1 mm) to fine (0.1 mm). Silt particle sizes range from coarse (0.05 mm) to fine (0.005 mm), clays from 0.002 mm to 0.0005 mm, and colloidal clays from 0.0002 mm to 0.00005 mm. More specific physical characteristics including surface area may be found in L. D. Baver's *Soil Physics*.

The cellulose used in the compositions of the invention is preferably that derived from wood or cotton, although many other sources such as wheat, oats, flax, and rice straw, corn stalks and cobs, sisal, hemp, sawdust, bark, forest humus and many other sources may be utilized. The most readily available source of cellulose is from paper, particularly newspapers, magazines, wrapping paper, discarded books and the like. These materials are highly advantageous not only because of the nature of the cellulose therein, but because they are readily recycled, thereby further enhancing the economic as well as environmental considerations and preservation and reuse of natural resources. Because the cellulose derived from such sources has already been chemically treated to remove lignins, gums, starches, and the like, and because the molecular size of the remaining cellulose is quite small in comparison to other above mentioned sources, these materials are ideally suited for the compositions of the present invention. Because of the large amount of undecomposed cellular material that is to be found in sewage sludge, it may be considered to be a satisfactory substitute for newspaper cellulose or paper pulp when those materials are unavailable. Other various synthetic cellulose is usually manufactured from petroleum sources and may also be used.

The amount of cellulose used will depend upon the specific and desired balance between the mass insulation and flexural or modulus of elasticity characteristics desired. The preferred amounts used are between about 0.1 and about 5%, by weight, of the composition. In finely divided clays with pronounced plastic characteristics and in fine silts as well, compressive strength will increase as cellulose is added up to a maximum of from 2%-5% by weight when it will begin to diminish with, however, an increase in the modulus of elasticity to much higher limits. In coarser soils, such as sands, the addition of fiberous material such as wood fiber, chopped sisal and hemp makes a significant contribution to the compressive and flexural strength of the composition. Sawdust, forest humus, straw, corn stalks or cobs, as well as cellular inorganic materials such as vermiculite, pearlite, diotomite, and cinders will contribute to the composition reduced energy capacity and increased energy resistance characteristics. When cellulose, fiberous material and/or cellular inorganic materials are used in amounts as high as about 85% by weight, relatively high insulation values are achieved but at the expense of compressive strength and thermal mass. When cellulose and fiberous materials such as wood fiber, sisal or hemp constitute approximately 50% of the total composition by weight, unusual flexural or elastic properties are present, which may be worthy of study by architects and engineers in earthquake prone areas. Accordingly, the compositions of the invention contain between about 2 and about 5% of paper derived cellulose, and up to 85%, and preferably up to 60%, by weight, of fiberous materials. These amounts, as well as all others set forth herein, are by weight of the total final cemented composition, exclusive of water added during mixing.

The sulfonic acids used in the compositions of the present invention comprise reaction products of sulfuric acid or other sulfonating agents with an organic compound or composition, commonly known in the art. Specific sulfonic acids include sulfuric acid sludge or spent sulfuric acid as described in my U.S. Pat. Nos. 3,876,439, 3,980,489 and 3,980,490, the description of which is incorporated herein by reference. Other useful sulfonic acids include lubricating oil sludges having an acid content as low as 30% acid and with as high as about 50% hydrocarbons. Accordingly, suitable sulfuric acid sludges are those materials having from about 92% acid and 2% hydrocarbons to about 30% acid and 50% hydrocarbons. The addition of a sulfonic acid to the soil composition is an essential feature of the composition and process of this invention.

The amount of sulfonic acid used in preparing a composition according to the invention will depend on the type of soil used. For example, some will have a high degree of ion-exchange, while others will not. Other soils will be finely divided, such as clays, resulting in significantly greater surface area exposed to the acid and on which a sulfonate may be formed, as compared to more coarse soils such as silts or sands. For example, in colloidal clays with high cation exchange capacities, the rate of usage of a typical alkylation spent acid with a sulfuric acid content of approximately 85% could be as much as one gallon per cubic yard of material, and as much as three gallons of sulfonated lubricating oil sludge with a 30% acid content might be required. On the other hand, the usage rate in sandy materials will require from 10%-25% the amounts needed for clays. If carbonates are present in substantial quantities such as in caliche, tufa and soft Florida limestone, the rate of application may be from 25%-75% higher than those sugested above. The usage rates just described are more than ten times those specified in my co-pending patent application Ser. No. 923,799 (0.5 to 8.0 gallons per 100 tons) and 3 to 5 times that specified in U.S. Pat. No. 3,876,439 (5 gallons sulfonic acid to 40 gallons per foot mile or approximately 125 tons of soil material). The primary reason for the accelerated usage of sulfonic acid is the enormous increase in the number of particles times the total surface area that must be contacted by the aqueous sulfonic acid solution. By comparison with typical paving aggregate compositions the total surface area of typical soils to which this invention is dedicated is in the order of times 500, and in the type of base and subbase materials to which my patent No. 3,876,439 is dedicated is in the order of times 50. The secondary reason for the increase in treatment is the need for higher bonding strengths than were required under either of these two prior inventions.

In order to determine a suitable amount of acid, according to the invention, is to add enough to initially reduce the pH of the soil to 2.0 or less. More specifically, for the coarsest of silts, an initial composition pH of a soil-sulfonic acid mixture of 2.0 or less is required, whereas for finely divided clays, a pH of 1.2 or less, preferably 1.0, and more preferably 0.8 or 0.9, is suitable. Normally, such amounts will comprise between about 0.01 and about 10% of the composition, and preferably between about 0.05 and about 5%.

In my aforesaid co-pending patent application Ser. No. 923,799 the reasons for the improved bonding of soils as a result of treatment with dilute sulfonic acid solutions are disclosed, and which description is incorporated herein by reference. It is the unique abilities possessed only by sulfonic acids described therein that make possible the effective utilization of a wide variety of cementing agents in soil conditions of the present invention. The specific cementing agents comprise a calcium containing cement such as Portland cement, lime ($CaO$ or $Ca(OH)_2$), or calcium carbonate, or an asphalt containing cement including asphaltic concrete, cutbacks and emulsions, whether cationic, anionic or non-ionic. In addition, tars, synthetic and natural resins, animal glues and plant gums may be more efffectively integrated into soil compositions. Alternatively, a combination of the two types of cementing agents may be used. The calcium containing cement will result in a higher bearing strength, whereas the asphalt cement will give good bearing strength as well as water proofing features. The amount of calcium containing cementing agent will be between about 1 and about 25%, by weight, whereas the asphalt containing cements will be between about 1 and about 10%. The resins may be used in amounts of between about 0.5 and about 5%.

The ability to incorporate cellulose and fiberous organic materials, sawdust, bark and bark mulch, forest humus, sewage sludge and/or various mineral fillers and to chemically bond it so as to obtain not only high insulative value, but to also be able to utilize the composition much in the same manner as sawn lumber, plywood, masonite, gypsum board and the like constitute another important feature of this invention. While straw, manure and other organic materials were once incorporated into adobe bricks, that practice has been largely discontinued because it has been determined that cellular materials introduced into soils without the benefit of chemical additives as described herein or in my co-pending patent application Ser. No. 928,798 will have a detrimental effect by further enhancing the high capillarity and moisture retention characteristics that such soils possess. Although attempts have been made to utilize such cellulosic materials in soil without the benefit of the chemical treatment described herein or in my co-pending patent application Ser. No. 928,798, negative results have always been obtained. It is the judicious use of cellular fragments of minute molecular size interlaced within the soil structure and which combined with the proper use of sulfonic acids and selected cementing agents that provides much of the novelty of this invention over other inventions for which I am responsible and those of others such as Hall, Chechot, Bronsky, Brunel, Wishlinski, Blott and Holmes. It is the ability to incorporate into the composition fiberous materials in sufficient quantities to greatly improve the modulus of elasticity or rupture and further to incorporate sawdust, bark mulch, wood chips, vermiculite and other porous or insulative materials so as to produce construction materials with characteristics similar to those of the lumber of timber industry, but which are fire and termite proof and highly resistant to mold or decay that distinguishes this invention from the others mentioned above.

Depending on the type of soil utilized in preparing the compositions of the invention, additional optional ingredients may be used to enhance the properties of the resulting compositions used in building materials. When utilizing soil materials that are deficient in the amount of cation exchange capacity, it is often difficult to achieve a proper balance between mass and insulation without the loss of adequate load bearing capacity when dry, or satisfactory structural integrity when saturated. Soils having substantial amounts of sand such as sandy loams or blow sand are examples of such cation exchange capacity deficient soils. These deficiencies are readily compensated for by the addition of clay in the amounts of between about 5% and about 20% by weight to achieve adequate balance of properties desired. Preferred clay materials are kaolin or kaolinite clays, the former comprising a substantial amount of kaolinite. However, fire clay and other native clays found in adjacent soil areas are useful, as are bentonite or montmorillonite.

When clay soils are encountered, large amounts of water are often required in order to provide liquidity necessary for pouring the compositions of the invention into molds or forms, and which results in a high degree of shrinkage. In order to reduce the shrinkage problem where it is objectionable or otherwise undesirable, the use of mineral fillers including sand, rock, stone, fly ash, perlite particles, vermiculite and other inorganic materials may be utilized. Of course, the specific amount of any of these mineral or inorganic fillers will depend on the amount of water required or desired, and the reduction in shrinkage to be achieved. Normally, amounts of between about 10% and about 40% by weight will be suitable, and will also materially reduce both the water and sulfonic acid requirements. However, using minimum amounts of water so that the composition must be tamped or compacted into the forms or molds is the preferred method. The specific amounts of water used in compositions containing coarsly divided soils such as silts and sand are less than about 10%, and preferably less than about 6%, by weight of the total composition. However, for finely divided clays, amounts up to about 40% may be required to achieve composition consistency for mixing and pouring.

In preparing suitable building material compositions containing the ingredients as described hereinabove and proportions thereof, certain processes or methods of mixing the ingredients are preferred. The addition of sulfonic acid to the source of cellulose is a preferred though not an essential feature of the composition process of this invention. When incorporating paper as the cellulose source, and in which the paper has been soaked in water prior to its mechanical agitation, such a treatment is particularly advantageous in order to test and evaluate the composition to determine the proper ratios of sulfonic acid, cellulose, cementing agent and soil. In making such an evaluation, it is particularly advantageous and preferred to add the sulfonic acid to the hydrous cellulose mixture and agitate the composition briefly to assure thorough mixing. Moreover, the sulfonic acid substantially aids in dispersing the cellulose in the composition. Thereafter, the resulting mixture is blended into the soil and thoroughly agitated until a substantially homogeneous mixture results. However, once the proper sulfonic acid:cellulose ratio has been determined, better results will be obtained if the sulfonic acid is added to the water prior to mixing the cellulose. This is especially true where cellulose is obtained from other materials such as straw, cotton, etc. In any event, the compositions are prepared by first mixing sulfonic acid with either the cellulose, or with the soil, or both, and only thereafter is the cementing agent added and mixed.

The need for reducing the pH of the soil solution to 2.0 or less in soils is general and to 1.0 to 1.2 in very finely divided plastic clays has been previously pointed out. Anyone familiar with the acid treatment of soils will recognize that in the majority of the soils throughout the world, the pH will, in time, adjust to a point near neutrality or at least the pH that was present when the treatment was made. If appreciable amounts of alkali and alkali metals are present, the neutralization will be quite rapid. If, on the other hand, ferrous and non-ferrous metals predominate in the soil structure, the rate of adjustment will be quite slow. It will be only in soils where silicates predominate that little or no adjustment will be noted. The highest pH at which the dispersal of organic compounds is effective when sulfonic acids are utilized is 3.5. Preferably, in finely divided soils the pH should be between 2.5 and 3.0 at the time when asphalt, tar, resins, glues or gums are added to the composition. Thus, the asphalt cementing agent should always be added before the pH reaches 3.5 and preferably before it reaches 2.0–2.5.

Since practice has indicated that a preliminary exposure of the soil to the sulfonic acid solution is beneficial and since a preliminary treatment of the source of cellulose with the acid is desirable, the preferred sequence of operation is to first introduce the sulfonic acid into the cellulose-water mixture, agitate or blend it for as long as is needed to attain a homogeneous mixture, add the soil along with any additional organic or inorganic filler material; then after making certain that a uniform composition has been formulated, add the selected cementing agent and continue the mixing until satisfactory results are obtained. If lime or cement are used either alone or in conjunction with other cementing agents, best results will be achieved when enough is added to bring the pH to a point above 7 or preferably to 9.5 or 10.0, and if the lime or cement is added after the other cementing agents have been added and thoroughly mixed.

To determine the most economical combination of chemicals, additives and cementing agents required in order to meet any particular set of specifications required by standard or local building codes, it will be necessary initially to utilize various quantities of sulfonic acids, cellulose, organic and inorganic fillers and cementing agents, compact and dry the compositions and then subject them to standard testing procedures.

The terms "sulfonic acid" and "sulfuric spent acid" are synonymous insofar as the meaning and intent of this invention are concerned. In all cases the source of the sulfonic acid is a sulfuric acid that has been "spent" or "contaminated" by virtue of contact with some type of petroleum hydrocarbon or other organic compound. While an alkylation spent acid was used in all of the examples shown, other types of sulfuric spent acids and sulfuric acid sludges as previously described, such as a sulfonation spent acid with a 50% sulfuric acid content, can be used, either by incorporating additional sulfuric acid and thoroughly agitating for 24 to 48 hours or, in most instances, mereby by increasing the rate of usage until the pH of the soil solution is lowered to the point necessary.

The following examples are given to illustrate the composition of the invention and improvement achieved thereby. It is understood that the examples are for the purpose of illustration only, and that the invention is not to be necessarily limited to the specific compositions thereof.

EXAMPLE 1

To sixteen ounces of a silty clay from the Corvallis area in central Oregon, having a plastic limit of 15-18 and a liquid limit of 30-35, was added cellulose, sulfuric spent acid, cement and/or asphalt in the amounts as shown below. The source of the cellulose was discarded newspapers which were soaked in water from 4 to 24 hours before homogenization in a blender. After thoroughly mixing the soil and the cellulose-sulfuric spent acid solution in a Hobart laboratory mixer until it was observed that the cellulose was evenly distributed throughout the mass, the asphalt or the cement was added to the mixture and again thoroughly agitated. If both were used, the asphalt was introduced first, then mixed and the cement was added last and again throughly agitated. The amount of water used was the minimum required in order to obtain adequate blending of soil and additives without increasing it further than was necessary above good compaction optimums. If that limit was exceeded, the soil composition was allowed to dry back to good compaction optimums before being placed in the molds. Then it was tamped into 2-inch cylinders for a specimen height of approximately 3 inches, ejected from the molds and allowed to dry for 24 hours in a standard laboratory drying oven at a temperature of 140° F. They were then subjected to standard unconfined compression testing methods, and the results were recorded as shown below. The values shown are in pounds per square inch and represent an average of two readings obtained from the specimens of two samples.

| | Weight in Grams | | Milliliters | | Dry |
|---|---|---|---|---|---|
| Sample # | Cellulose | Portland Cement | Sulfuric Spent Acid* | Asphalt | Compressive Strength |
| 1 | — | — | — | 15 SS-1** | 225 |
| 2 | — | — | — | 30 " | 245 |
| 3 | — | — | 1.25 | 15 " | 300 |
| 4 | — | — | 2.5 | 30 " | 360 |
| 5 | 5.0 | — | 1.25 | 15 " | 330 |
| 6 | 10.0 | — | 2.5 | 30 " | 405 |
| 7 | 10.0 | — | 5.0 | 30 " | 440 |
| 8 | — | — | — | 15 AC-10*** | 195 |
| 9 | 5.0 | — | 1.25 | 15 " | 487.5 |
| 10 | 5.0 | — | 2.5 | 15 " | 545 |
| 11 | 10.0 | — | 5.0 | 30 " | 575 |
| 12 | — | 15 | — | — | 330 |
| 13 | — | 30 | — | — | 375 |
| 14 | — | 15 | 2.5 | — | 470 |
| 15 | — | 30 | 5.0 | — | 515 |
| 16 | 10.0 | 15 | 2.5 | — | 625 |
| 17 | 10.0 | 30 | 5.0 | — | 790 |
| 18 | 10.0 | 60 | 5.0 | — | 975 |

*Sulfuric spent acid with approximately 87% acid content from alkylation process
**SS-1 is a standard anionic emulsion
***AC-10 is a standard asphaltic concrete as produced by Husky Oil Co.

EXAMPLE 2

A sandy material from the Cherry Creek District of Denver, Colo., of the following graduation was used:

| Passing | Retained On | % |
|---|---|---|
| 16 mesh | 30 mesh | 14 |
| 30 " | 50 " | 27 |
| 50" | 100 " | 29 |
| 100 " | 200 " | 20 |
| 200 " | — | 10 |

The procedures followed were the same as those described in Example 1 except that in the case of Samples 11 and 12 the cement was added to composition prior to the introduction of the asphalt. Since Samples 9 and 11 and 10 and 12 are identical except for the reversal of the order of the introduction of asphalt and cement, it is obvious that a higher compressive strength results when the asphalt is added first.

| | Weight in Grams | | Milliliters | | Dry |
|---|---|---|---|---|---|
| Sample # | Cellulose | Portland Cement | Sulfuric Spent Acid | Asphalt | Compressive Strength |
| 1 | — | — | — | 30 SS-1 | 125 |
| 2 | — | 30 | — | — | 205 |
| 3 | 10.0 | — | — | 30 AC-10 | 0 |
| 4 | — | — | 2.5 | 30 SS-1 | 240 |
| 5 | 10.0 | — | 2.5 | 30 " | 280 |
| 6 | — | — | 2.5 | 30 AC-10 | 400 |
| 7 | 5.0 | — | 2.5 | 15 " | 500 |
| 8 | 10.0 | — | 2.5 | 15 " | 535 |
| 9 | — | 30 | 4.0 | 15 " | 450 |
| 10 | 10.0 | 30 | 4.0 | 15 " | 470 |
| 11* | — | 30 | 4.0 | 15 " | 370 |
| 12* | 10.0 | 30 | 4.0 | 15" | 410 |
| 13 | 10.0 | 30 | 4.0 | 30 " | 575 |
| 14 | 5.0 | 60 | 5.0 | — | 1000 |
| 15 | 10.0 | 75 | 5.0 | — | 1150 |

*Cement added before asphalt

EXAMPLE 3

Because of the difficulty with which sandy materials like those described in Example 2 from the Cherry Creek District of Denver are sealed against the entrance of moisture when immersed in water, except replicas of Samples 1, 2, 7, 9, 10, 13 and 14 from Example 2 were produced in accordance with the procedures described in Example 1. After each sample had been weighed, all were immersed for a period of 72 hours, then weighed again in order to determine the weight percentage of moisture absorbed. Subsequently the compressive strength of each sample was determined by standard unconfined compression methods while still saturated. The values shown below accurately reflect the unusual dispersal effect sulfuric spent acids demonstrate when used in conjunction with asphaltic concrete. In addition, it can be seen that the inclusion of finely divided cellulose measurably improves the wet strength of the samples and aided in reducing the amount of moisture permeating into the interior of the structure.

soil compositions, specimens were placed upon a constantly water-saturated porous surface for seven days in accordance with UB Procedure Section 24.1410. Clay having a plastic limit of 18–20 and a liquid limit of 48–50 from the Tranquillity area in the San Joaquin Valley of California and the sandy material from the Cherry Creek District of Denver previously described were used in this series of tests. Samples approximately 3 inches high were compacted in a standard 6-inch compaction mold by use of a Soiltest CN-415 standard compaction hammer. The results tabulated below verify that the addition of cellulose to untreated soil is detrimental to its moisture absorption characteristics and that the use of sulfuric spent acid in conjunction with either cement or asphaltic concrete is highly beneficial in reducing absorption by capillarity.

| Sample # | Oz. Dry Weight | Cellulose | % Portland Cement | Sulfuric Spent Acid | Asphalt AC-10 | Net Weight | % Absorption |
|---|---|---|---|---|---|---|---|
| Tranquillity Clay ||||||||
| 1 | 86.4 | -0- | -0- | -0- | -0- | 96.9 | 12.2 |
| 2 | 84.3 | 2.2 | -0- | -0- | -0- | 95.8 | 13.6 |
| 3 | 87.1 | -0- | 6.0 | -0- | -0- | 96.4 | 10.7 |
| 4 | 82.7 | -0- | -0- | -0- | 4.0 | 100.1 | 12.1 |
| 5 | 83.2 | 2.2 | 3.0 | .5 | -0- | 95.9 | 5.3 |
| 6 | 85.6 | 2.2 | -0- | .4 | 4.0 | 95.8 | 1.2 |
| Cherry Creek Sandy Material ||||||||
| 1 | 88.2 | -0- | -0- | -0- | -0- | 95.6 | 8.4 |
| 2 | 86.7 | 2.2 | -0- | -0- | -0- | 94.8 | 9.3 |
| 3 | 87.1 | -0- | 6.0 | -0- | -0- | 92.4 | 6.1 |
| 4 | 85.9 | -0- | -0- | -0- | 4.0 | 93.8 | 9.2 |
| 5 | 87.8 | 2.2 | 3.0 | .4 | -0- | 89.6 | 2.0 |
| 6 | 84.6 | 2.2 | -0- | .3 | 4.0 | 85.4 | .9 |

| Sample # | Weight in Grams Dry Weight | Weight in Grams Wet Weight | Water Absorbed | % | Saturated Compressive Strength | Dry Compressive Strength |
|---|---|---|---|---|---|---|
| 1 | 275.1 | 271.5 | 14.4 | 5.60 | 45 | 125 |
| 2 | 269.6 | 322.6 | 53.0 | 7.29 | 0 | 205 |
| 7 | 280.2 | 285.3 | 5.1 | 1.82 | 273 | 500 |
| 8 | 271.4 | 277.0 | 5.6 | 2.06 | 300 | 535 |
| 9 | 284.3 | 296.7 | 12.4 | 4.36 | 200 | 450 |
| 10 | 287.3 | 292.9 | 5.6 | 1.96 | 285 | 470 |
| 13 | 261.6 | 265.7 | 4.1 | 1.57 | 364 | 575 |
| 14 | 290.5 | 339.5 | 49.0 | 6.87 | 244 | 1000 |

EXAMPLE 4

In order to determine the comparative rates of absorption by capilliarity of various treated and untreated

EXAMPLE 5

In order to illustrate the unique abilities sulfuric spent acids demonstrate in the production of cemented soil compositions that will possess some of the characteristics of insulation as well as mass and will provide light weight building materials, samples, into which were incorporated the quantities of soil, cellulose, sawdust, wood fiber or vermiculite shown below, were formulated. The procedures used were those described in Example 1 except that the sawdust, wood fiber or vermiculite were added prior to the application of the asphalt or tar. The soil used was plastic clay from the Tranquillity area of California as previously described.

| Sample # | Oz. Soil | Grams Cellulose | Milliliters Sulfuric Spent Acid | Milliliters Asphalt | Ounces Sawdust | Ounces Wood Fiber | Dry Compressive Strength |
|---|---|---|---|---|---|---|---|
| 1 | 16 | 10 | 4.0 | 15 AC-10 | 1 | — | 340 |
| 2 | 16 | 10 | 4.0 | 15 " | 1½ | — | 365 |
| 3 | 16 | 10 | 4.0 | 15 " | 2 | — | 305 |
| 4 | 16 | 10 | 4.0 | 15 MC-800 | 1 | — | 230 |
| 5 | 16 | 10 | 4.0 | 15 " | 2 | — | 215 |
| 6 | 16 | 10 | 4.0 | 15 tar* | 1 | — | 345 |
| 7 | 16 | 10 | 4.0 | 15 AC-10 | 2 | 1 | 270 |
| 8 | 8 | 20 | 2.0 | 20 " | 3 | 1½ | 215 |
| 9 | 6 | 20 | 1.5 | 20 " | 4 | 1 | 190 |
| 10 | 4 | 20 | 1.25 | 20 " | 4 | 1 | 170 |

-continued

| Sample # | Oz. Soil | Grams Cellulose | Milliliters Sulfuric Spent Acid | Asphalt | Ounces Saw-dust | Wood Fiber | Dry Compressive Strength |
|---|---|---|---|---|---|---|---|
| 11 | 8 | 20 | 2.0 | 20 " | 4 | Vermiculite | 155 |

*Gilsonite-tar paving sealer--BrewerCote Asphalt Products, Miami, Florida

EXAMPLE 6

In order to further demonstrate the wide variety of compositions that can be produced by use of the processes described in this invention, the following table is provided. Sample 1 may be considered as the control. It was produced from Tranquillity clay in accordance with the procedures outlined in Example 1. Samples 2 through 7 are replicas of those shown in the preceding example. Of particular significance is the reduction in specific gravity and the alteration of the energy resistance and capacity values as increasing amounts of material with higher insulation values are incorporated. Energy resistance is stated in btu/in(hr) (sq.ft.) (°F.) and energy capacity in btu/144 (in$^3$) (°F.).

| Sample # | % by Weight Soil and Asphalt | Sawdust Cellulose and Fiber | Cellulose & Vermiculite | Specific Gravity | Estimated Energy Values Resistance | Capacity |
|---|---|---|---|---|---|---|
| 1 | 98 | 2 | — | 1.65 | .115 | 2.4 |
| 2 6* | 92 | 8 | — | 1.43 | .300 | 2.35 |
| 3 7* | 83 | 17 | — | 1.22 | .525 | 2.25 |
| 4 8* | 60 | 40 | — | .87 | .750 | 2.15 |
| 5 9* | 52 | 48 | — | .68 | .875 | 2.05 |
| 6 10* | 41 | 59 | — | .57 | 1.000 | 2.00 |
| 7 11* | 63 | — | 37 | .76 | .750 | 2.25 |

*Refers to sample number in Example 5

EXAMPLE 7

Samples 1 through 7 from Example 6 were used for purpose of determining the degree to which standard fasteners usually associated with wooden construction could be used with the various compositions. It was found that nails could be driven into Samples 1 through 3 and that the average holding power appeared to be approximately that of white pine while being withdrawn by force. Screws could be readily driven into Samples 1 through 4, were firmly embedded and could support a load of some magnitude. Expanding or expansive type of anchor fittings were found to be necessary in Samples 5 through 7 and were capable of supporting a load as adequately as standard gypsum or particle board, for example.

EXAMPLE 8

Samples 1 through 7 from Example 6 were subjected to exposure to a flame approximately 2½ inches long from a propane torch to determine the degree to which they displayed resistance to combustion under such conditions. Samples 1 through 3, while glowing red around the perimeter of the flame and incandescent in the center, did not at any time support combustion. Samples 4 through 6 did support combustion for 1 or 2 seconds after the flame from the torch was removed, but like Sample 1, proved to be extremely resistant to combustion and little or no damage was detectable afterwards. Sample 7 responded in the same manner as Sample 1.

EXAMPLE 9

In order to determine if the soil-cellulose-sulfuric spent acid compositions encompassed by this invention might be used in the same manner as plaster or stucco applied with a trowel or sprayed with special equipment in the same manner as chemically treated fire retardant cellulose, various soil-cellulose compositions containing varying proportions of cellulose, fly ash, lime, calcium carbonate, cement, sulfuric spent acid and AC-10 asphalt were produced as shown below in accordance with the procedures outlined in Example 1. Since the sewage sludge, sometimes referred to as Nitrohumus in lawn and garden supply stores, is another economical source of cellulose, it was utilized in Samples 5 and 6 as noted as an alternate to newspaper cellulose. All compositions proved to be amenable to use as plaster or stucco when applied to vertical surfaces in thicknesses up to ½-inch or more with a trowel. However, compositions containing cement or lime proved to be the most adaptable to this process and dried much more quickly.

| Sample # | Grams Cellulose | Fly Ash | Lime | CaCo$_3$ | Cement | Milliliters Sulfuric Spent Acid | Asphalt AC-10 |
|---|---|---|---|---|---|---|---|
| 1 | 10.0 | — | — | 60 | — | 5.0 | 30 |
| 2 | 15.0 | — | 60 | — | — | 5.0 | 30 |
| 3 | 20.0 | — | — | — | 60 | 5.0 | 30 |
| 4 | 10.0 | — | — | — | — | 2.5 | 30 |
| 5 | 60.0* | 75 | 60 | — | — | 5.0 | — |
| 6 | 60.0* | 75 | — | — | 60 | 5.0 | — |

*Los Angeles Sewage Sludge

The above examples illustrate improvements of the composition of the invention as described herein. By utilizing such compositions, energy efficient, solar oriented homes and commercial buildings will result both in substantial savings in the initial cost of construction as well as substantially reduced energy requirements in future years. Moreover, as was pointed out in my copending patent application Ser. No. 928,798, the ability to properly balance the mass and insulation characteristics of various building components so that solar energy is more readily utilized than is possible in any standard construction method.

Even at today's inflated prices, soil is still by far the cheapest building material available. When used in conjunction with sawdust, wood fiber, straw, fly ash, vermiculite, sewage sludge, old newspapers and forest humus it can be chemically cemented together so as to make possible the construction of low cost, fire and termite proof buildings into which nails and other standard fasteners can be inserted and which may be finished in much the same manner as wood, plaster or stucco. Since the sulfuric spent acid or sludges that are the key to this invention are considered by many government agencies to be extremely hazardous materials, their disposal into the walls, floors, footings and foundations of homes and commercial buildings can be of great benefit to this country in the years ahead when our fossil fuels and other resources become ever more scarce and expensive.

I claim:

1. An improved earthen construction composition comprising:

soil, a sulfonic acid, cellulose, and a cementing agent selected from the group consisting of Portland cement, $CaCO_3$, lime, asphalt, tars, synthetic and natural resins, and mixtures thereof.

2. The composition of claim 1 wherein said sulfonic acid comprises a spent sulfuric acid.

3. The composition of claim 2 including a fiberous material selected from the group consisting of wood fiber, chopped sisal, chopped hemp, sawdust, forest humus, straw, corn stalks and corn cobs.

4. The composition of claim 2 including a cellular inorganic material selected from the group consisting of vermiculite, diatomite, and pearlite.

5. The composition of claim 2 wherein said cellulose comprises paper and is between about 0.1 and about 5 percent, by weight, of the composition.

6. The composition of claim 3 wherein said cellulose comprises paper and is between about 0.1 and about 5 percent, by weight, and said fiberous material is up to about 85%, by weight, of the composition.

7. The composition of claim 6 wherein said cementing agent is selected from the group consisting of Portland cement, $CaCO_3$ and lime, and is between about 1 and about 25%, by weight, of the composition.

8. The composition of claim 6 wherein said cementing agent is selected from the group consisting of asphalt and tar, and is between about 1 and about 10%, by weight, of the composition.

9. The composition of claim 5, 6, 7 or 8 wherein said sulfonic acid comprises between about 0.01 and about 10%, by weight, of the composition.

10. A process of preparing a composition of claim 1 comprising preparing a mixture of sulfonic acid, soil and cellulose having a pH of below about 2.0, and thereafter adding the cementing agent.

11. A process of preparing a composition of claim 8 comprising preparing a mixture of sulfonic acid, soil and cellulose having a pH of below about 2.0, and thereafter adding asphalt to the mixture, before the pH rises above about 3.5.

12. The process of claim 11 wherein the asphalt is added before the pH rises above 2.5.

13. A process of claim 11 wherein the sulfonic acid is added to an aqueous mixture of the cellulose and blended, mixing the soil with sulfonic acid cellulose blend, adding the asphalt, mixing, and allowing the mixture to dry to achieve the composition.

* * * * *